Dec. 28, 1948.   C. A. CARLSON ET AL   2,457,346
LOADING AND STACKING MACHINE
Filed July 1, 1946   3 Sheets-Sheet 2
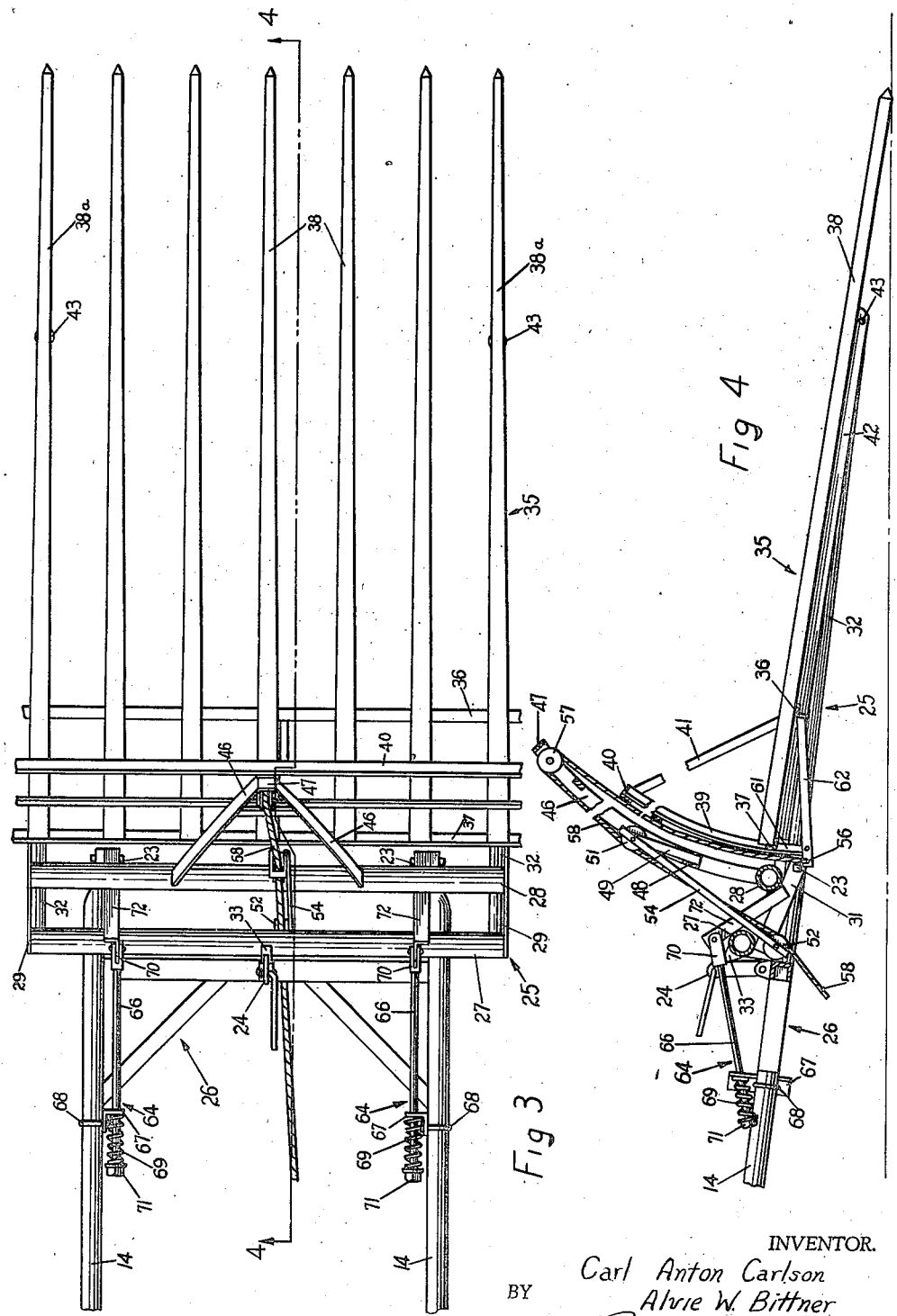
INVENTOR.
Carl Anton Carlson
Alvie W. Bittner
BY Rudolph L. Lowell
ATTY.

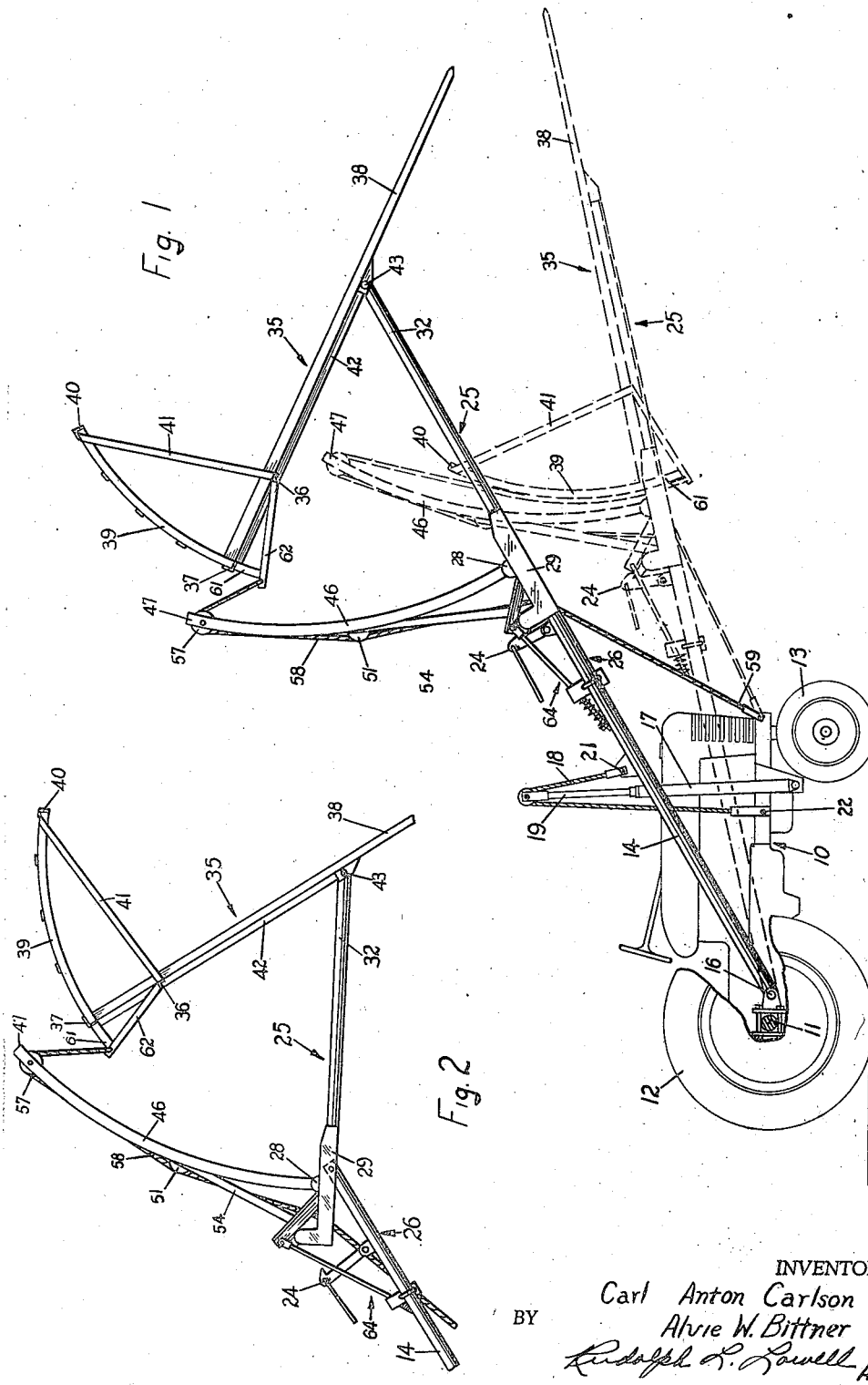

Dec. 28, 1948. C. A. CARLSON ET AL 2,457,346
LOADING AND STACKING MACHINE
Filed July 1, 1946 3 Sheets-Sheet 3

INVENTOR.
Carl Anton Carlson
Alvie W. Bittner
BY
ATTY.

Patented Dec. 28, 1948

2,457,346

UNITED STATES PATENT OFFICE 2,457,346

LOADING AND STACKING MACHINE

Carl Anton Carlson and Alvie W. Bittner, Fort Dodge, Iowa

Application July 1, 1946, Serial No. 680,714

3 Claims. (Cl. 214—140)

This invention relates generally to loading machines and in particular to a tractor loading attachment for handling hay and like material.

An object of this invention is to provide an improved loading and stacking machine.

A further object of this invention is to provide a loading machine in which a rake, tiltably mounted on a pair of pivoted lifting arms, is movable to a dumping position concurrently with an elevation of the lifting arms, and to a loading position when the lifting arms are lowered.

Yet another object of this invention is to provide a loading machine in which a rake, supported for tiltable movement on a pair of pivoted lifting arms, is movable to dumping and loading positions in response to a raising and lowering of the lifting arms, and adapted for pivotal movement at any raised position of the lifting arms to increase the dumping angle thereof.

A still further object of this invention is to provide a rake attachment which is readily interchangable with a dirt or manure handling scoop in a loading machine having a pair of pivoted lifting arms arranged at opposite sides of a portable frame.

Yet another object of this invention is to provide a hay loading machine which is of a simple and rugged construction, and efficient in operation to load hay for transport or stacking purposes.

A feature of this invention is found in the provision for a loading machine of a rake attachment which is interchangeable with a material handling scoop pivotally supported between a pair of pivoted lifting arms arranged at opposite sides of the portable frame of the loading machine. The attachment includes a pivoted frame adapted to be pivotally supported at its rear end on the forward ends of the lifting arms and releasably locked against pivotal movement in a longitudinally aligned position with the lifting arms. A rake pivotally mounted adjacent the forward end of the pivoted frame has its rear end connected to one end of a cable, which is then extended upwardly over a rigid upright frame, carried on the pivoted frame rearwardly of the rake, and downwardly of the frame for connection of its opposite end with the portable frame of the loading machine. On raising and lowering of the lifting arms the rake is concurrently moved to loading and dumping positions therefor, with the pivoted frame being releasable at any elevated position of the rake to provide an increased rake dumping angle for the rake.

Further objects, features and advantages of this invention will become apparent from the following description when taken in connection with the accompanying drawings in which:

Fig. 1 is a side elevational view of a loading machine showing the rake attachment of this invention in assembly relation therewith;

Fig. 2 is a fragmentary side elevation of the front portion of the assembly shown in Fig. 1, showing the rake attachment in a changed position;

Fig. 3 is a top plan view of the rake attachment;

Fig. 4 is a sectional view taken on the line 4—4 in Fig. 3.

Figure 5:
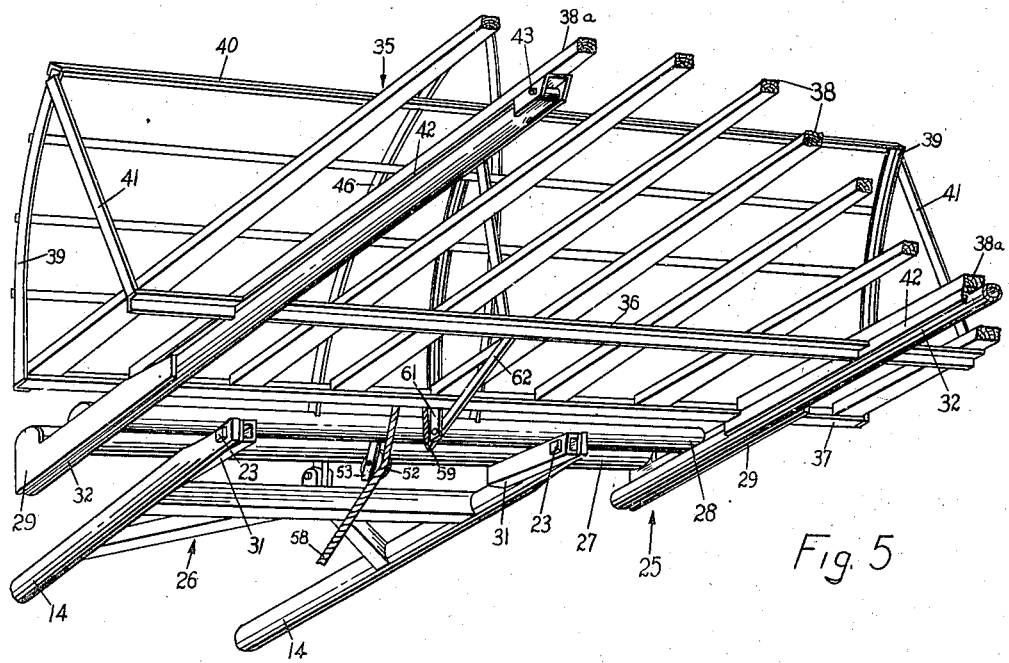
Fig. 5 is a fragmentary bottom perspective view of the rake attachment.

With reference to the drawings the rake attachment of this invention is illustrated in Fig. 1 in assembly relation with a loading attachment for a farm tractor having a frame 10, a rear axle 11, rear traction wheels 12 and steering wheels 13. A pair of pivoted lifting arms 14 (Figs. 1 and 3), arranged at opposite sides of the tractor, are pivoted at their rear ends at 16 on the tractor rear axle 11. The lifting arms are raised and lowered by means including a pair of upright hydraulic cylinders 17, positioned at opposite sides of the tractor between the tractor frame 10 and an adjacent lifting arm 14. Cables 18 are movably supported intermediate their ends at the upper ends of piston rods 19 for the cylinders 17, with one end of the cables 18 being connected at 21 to the lifting arms 14, and the opposite ends of the cables 18 being connected at 22 to the tractor frame 10. Oil under pressure for operating the cylinders 17, to raise and lower the lifting arms 14, is supplied from an oil pump unit (not shown) operated from the tractor engine.

The loading machine thus far described is of a commercially available type usually provided with a scoop or bucket (not shown) pivoted on bolts 23 (Fig. 3) between the forward ends of the lifting arms 14. A catch on the rear wall of the scoop, is releasably engageable with a pivoted latch 24 pivotally supported on a frame structure, indicated generally at 26, connected between the forward ends of the lifting arms 14. The latch 24 is adapted to be operated in a usual manner by the tractor operator.

Figure 6:
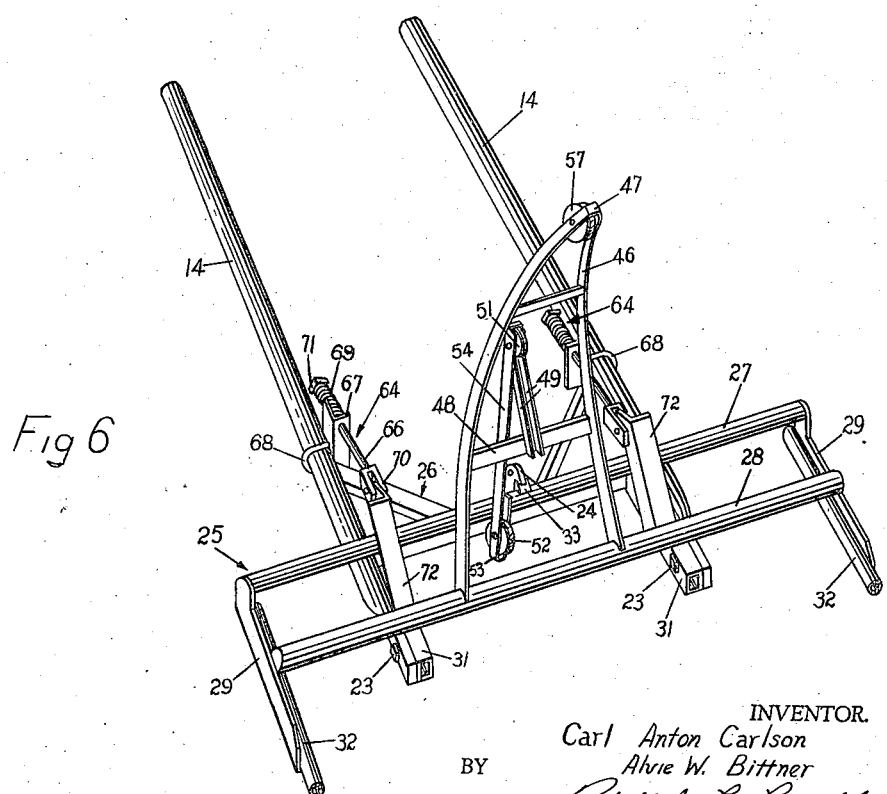
Fig. 6 is a fragmentary front perspective view of the attachment with the rake removed.

The rake attachment of this invention (Figs. 5 and 6) includes a pivoted frame, designated generally as 25, having a pair of transversely extended frame members 27 and 28 arranged in a spaced parallel relation, with the member 27 being at a higher level than the member 28. Welded to opposite ends of the frame members 27 and 28 are plate members 29, which are extended forwardly of the front member 28. The frame members 27 and 28 are further connected together intermediate their ends by a pair of transversely spaced brace members 31, of a substantially box shape in cross section, and inclined upwardly and rearwardly from the frame member 28 to provide for the brace members 31 being welded to the under sides of the frame members 27 and 28. Secured to the inner sides of the plate members 29, and projected forwardly from the plate members, are arm extensions 32. It is contemplated that the arm extensions 32, and the frame members 27 and 28 be of a tubular or pipe construction.

The pivoted frame 25 is pivotally supported on the forward ends of the lifting arms 14 by the bolts 23 which are extended transversely of the arms 14 and through the box section members 31. The frame 25 is held against pivotal movement, when the arm extensions 32 are in substantial longitudinal alignment with the lifting arms 14, by the engagement of the latch 24 with an upright catch member 33 carried on the frame member 27. It is seen, therefore, that when the latch 24 is in engagement with the catch 33 that the frame 25 constitutes a forward extension for the lifting arms 14. On release of the latch 24 the pivoted frame is moved downwardly by the action of gravity for a purpose which will appear later.

A rake, indicated generally as 35 (Figs. 1 and 5), includes a pair of transverse longitudinally spaced base members 36 and 37 for supporting rake tines 38. The back wall 39 of the rake is of a generally arcuate shape and curves upwardly and forwardly from the base member 37, so that its upper end 40 terminates at a position substantially above the base member 36. A pair of oppositely arranged brace members 41 are connected between the upper end 40 of the rake back wall 39 and the forward base member 36.

Secured to the under sides of the tines, indicated as 38a (Figs. 3 and 5), and faced downwardly, are angle members 42. As best appears in Fig. 5 the forward rake base member 36 is cut away at the tines 38a to accommodate the angle members 42, which are welded to adjacent parts of the base member 36.

The front ends of the arm extensions 32 are pivotally supported on bolts 43 which are suitably carried at the forward ends of the angle members 42. The rake 35 is thus tiltably mounted on the bolts 43 for up and down pivotal movement relative to the pivoted frame 25, when the latch 24 is engaged with the catch 33, and for movement with the pivoted frame 25, at any moved position thereof, when the latch 24 is released.

Located rearwardly of the rake 35 is an upright frame 46, of a substantially A shape, having its lower end rigidly secured to the transverse frame member 28 of the pivoted frame 25. The frame 46 is of an arcuate shape and curves forwardly and upwardly in a substantially concentric relation with the back wall 39 of the rake, when the rake is in a loading position as illustrated in Fig. 4, and in dotted lines in Fig. 1. The frame 46 extends above the top level of the rake backwall 39 so that its upper end 47 is projected forwardly over the rake.

A cross brace 48, for the frame 46, is provided with a pair of spaced lugs 49 between which a pulley 51 is rotatably supported. A second pulley 52 is supported from the frame member 27, of the pivoted frame 25, in a U-shaped bracket member 53 one leg 54 of which is extended upwardly for connection with the lug 49 to constitute a supporting brace for the pulley 51. A third pulley 57 is rotatably supported at the upper end 47 of the frame 46, with the three pulleys 51, 52 and 57 being in longitudinal alignment to guidably support a cable 58.

One end of the cable 58, (Fig. 1) is attached at 59 to the forward end of the tractor frame 10, and from such end extends under the pulley 52, over the pulleys 51 and 57 and then downwardly across the front side of the frame 46 for connection of its opposite end 56 with the free end of a downwardly extended projection 61 carried on the rear rake base member 37 (Fig. 4). A brace member 62 connects the projection 61 with the front rake base member 36.

In the operation of the loading machine of this invention assume the lifting arms 14 to be in their lowered positions shown in Fig. 4, with the rake 35 in a loading position and the pivoted frame 25 held against pivotal movement by the latch 24. The rake 35 is then loaded by a usual bucking operation, namely, by advancing the rake into the material to be handled.

With the rake loaded the hydraulic cylinders 17 are operated to elevate the lifting arms 14 and in turn the rake 35. On an initial elevation of the lifting arms 14 to their dotted line positions illustrated in Fig. 1, which represents a rake elevation of about six feet, the rake remains substantially stationary relative to the pivoted frame 25. When the elevation of the lifting arms 14 is continued above their dotted line showing in Fig. 1, the cable 58, by virtue of its connection at 59 with the tractor frame 10, and with the rake 35 at the projection 61, provides for a downward tilting movement of the rake concurrently with the elevation of the lifting arms to a maximum tilted position shown in full lines in Fig. 1, which represents an elevated height of about twelve to thirteen feet. The tilted position of the rake 35 at its maximum elevation is sufficient to unload any hay or like material carried thereon.

On a lowering of the lifting arms 14 the rake 35 is movable by the action of gravity against the cable 58 to its unloading position.

In starting a hay stack, or in the loading of a hay sling or a hay rack it may be necessary or desirable to dump the rake 35 prior to its movement to a maximum elevated position. For this purpose the latch 24 is operated to release the pivoted frame 25. With release of the pivoted frame 25 the rake 35 is immediately dumped to a position such that the tines 38 approach a position located in a vertical plane as illustrated in Fig. 2.

The downward pivotal movement of the frame 25, relative to the lifting arms 14, is limited by the action of a pair of oppositely arranged snubbers 64 connected between the arms 14 and the frame 25 (Figs. 2, 3, 4 and 6). Each snubber 64 includes a bolt member 66 slidably extended through a plate member 67 which is secured to the inner side of an adjacent lifting arm 14 by a clamp device 68. A coil spring 69, mounted about the bolt 66, is maintained in compression between the rear side of the plate member 67 and a nut 71 threadable on the rear end of the bolt 66. The forward end of the bolt 66 is pivotally connected at 70 with the upper end of an upwardly and rearwardly extended bracket member 72 which is secured as by welding to the frame member 27 and a corresponding box section member 31.

On release of the latch 24, therefore, the springs 69 are compressed whereby the pivoted frame 25 is yieldably brought to a stop at a limited downward pivotally moved position. The rake 35 and the pivoted frame 25 are movable from their relative positions shown in Fig. 2, to their relative positions shown in Fig. 4, on a lowering of the lifting arms 14.

From a consideration of the above description it is seen that the invention provides a loading machine for handling hay and like material which is of a simple and compact construction and in which the rake 35 is moved to a dumping position in response to an elevation of the lifting arms 14. Likewise the rake 35 is movable by gravity to a loading position, concurrently with the lowering of the arms 14. The rake attachment, including the rake 35 and the pivoted frame 25, is readily interchangeable with a pivoted manure scoop, associated with a pair of pivoted lifting arms arranged at opposite sides of a usual farm tractor When the rake is raised to its maximum elevation, it automatically dumps the material from the rake. It is apparent, of course, that the rake 35 may be dumped at any elevated position of the lifting arms 14 on release of the pivoted frame 25 by the latch 24.

Although the invention has been described with respect to a preferred embodiment thereof it is to be understood that it is not to be so limited since changes and modifications can be made therein which are within the full intended scope of this invention as defined by the appended claims.

We claim:

1. In a loading and stacking machine having a pair of pivoted lifting arms arranged at opposite sides of a portable frame, a rake tiltably mounted on said arms, an upright stationary frame on said arms located rearwardly of said rake, and inclined upwardly and forwardly such that its upper end projects forwardly of the rear end of the rake, when the rake is in a loading position, flexible means connected at one end to the rear end of said rake and extended upwardly over said frame and then downwardly below said frame for connection at its opposite end with said portable frame, and means including a pulley at the upper end of said upright frame for movably supporting said flexible means.

2. A loading machine comprising a portable frame having a pair of pivoted lifting arms arranged at opposite sides thereof, a forward extension pivotally supported on said lifting arms, means for releasably locking said extension in longitudinal alignment with said lifting arms, a rake tiltably mounted on said extension, an upright frame on said extension located rearwardly of said rake, pulleys spaced longitudinally of said upright frame, a flexible means movably supported on said pulleys having one end attached to said rake and an opposite end attached to said portable frame for progressively tilting said rake as said lifting arms are raised, means for releasing said locking means to provide for a dumping of said rake at any moved position of said lifting arms, and means for limiting the downward pivotal movement of said forward extension on release of said locking means.

3. A hay loading and stacking attachment for a loading machine having a portable frame and a pair of pivoted lifting arms arranged at opposite sides of said portable frame, comprising a pivoted frame extended forwardly of said lifting arms and pivotally connected at its rear end on said arms, means for releasably locking said pivoted frame against pivotal movement in a longitudinally aligned position with said lifting arms, a rake tiltably mounted adjacent the forward end of said pivoted frame, an upright frame on said pivoted frame located rearwardly of said rake, flexible means connected at one end to the rear end of said rake and extended upwardly over said frame and then downwardly below said frame for connection of its opposite end with said portable frame, means on said upright frame for movably supporting said flexible means, said rake, through the instrumentality of said upright frame and flexible means, being automatically tilted to a dumping position as said lifting arms are moved to a fully raised position therefor, and manually actuated means for releasing said locking means to provide for a dumping of said rake at any raised position of said lifting arms.

CARL ANTON CARLSON.
ALVIE W. BITTNER.

REFERENCES CITED

The following references are of record in the file of this patent:

UNITED STATES PATENTS

| Number | Name | Date |
| --- | --- | --- |
| 1,733,969 | Knapp, Jr. | Oct. 29, 1929 |
| 2,298,200 | Court | Oct. 6, 1942 |
| 2,341,945 | Rabon | Feb. 15, 1944 |
| 2,394,830 | Woodin | Feb. 12, 1946 |
| 2,398,119 | Sauder | Apr. 9, 1946 |
| 2,413,097 | Barker | Dec. 24, 1946 |